(12) United States Patent
Hirth et al.

(10) Patent No.: US 9,610,539 B2
(45) Date of Patent: Apr. 4, 2017

(54) EXHAUST-GAS TREATMENT DEVICE

(71) Applicant: EMITEC GESELLSCHAFT FUER EMISSIONSTECHNOLOGIE MBH, Lohmar (DE)

(72) Inventors: Peter Hirth, Roesrath (DE); Jan Hodgson, Troisdorf (DE); Peter Bauer, Siegburg (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 247 days.

(21) Appl. No.: 14/269,617

(22) Filed: May 5, 2014

(65) Prior Publication Data
US 2014/0241951 A1    Aug. 28, 2014

Related U.S. Application Data

(63) Continuation of application No. PCT/EP2012/070544, filed on Oct. 17, 2012.

(30) Foreign Application Priority Data

Nov. 4, 2011  (DE) .......................... 10 2011 117 624

(51) Int. Cl.
*F01N 3/28* (2006.01)
*B01D 53/94* (2006.01)
(Continued)

(52) U.S. Cl.
CPC ............. *B01D 53/94* (2013.01); *F01N 3/027* (2013.01); *F01N 3/0222* (2013.01);
(Continued)

(58) Field of Classification Search
None
See application file for complete search history.

(56) References Cited

U.S. PATENT DOCUMENTS 5,146,743 A    9/1992  Maus et al.
5,322,672 A    6/1994  Breuer et al.
(Continued)

FOREIGN PATENT DOCUMENTS

DE    10004545 A1    10/2001
JP    H07197808 A     8/1995
(Continued)

*Primary Examiner* — Walter D Griffin
*Assistant Examiner* — Jelitza Perez
(74) *Attorney, Agent, or Firm* — Laurence A. Greenberg; Werner H. Stemer; Ralph E. Locher

(57) ABSTRACT

An exhaust-gas treatment device includes a honeycomb body wound and/or stacked with at least partially structured sheet-metal layers forming channels through which an exhaust gas can flow in axial direction from an inlet side to an outlet side. A first section of the sheet-metal layers ends flush at a first end surface associated with at least one of the sides and a second section of the sheet-metal layers ends at a second end surface associated with at least one of the sides. A spacing is provided between the first and second end surfaces because a first axial length of the first section is greater than a second axial length of the second section. The spacing forms a receptacle receiving a heating body, producing a simple electrically heatable exhaust-gas treatment device into which a heating body can be integrated during or after production of the honeycomb body.

10 Claims, 4 Drawing Sheets

(51) Int. Cl.
*F01N 3/20* (2006.01)
*F01N 3/022* (2006.01)
*F01N 3/027* (2006.01)

(52) U.S. Cl.
CPC ........... *F01N 3/2013* (2013.01); *F01N 3/281* (2013.01); *B01D 2255/90* (2013.01); *F01N 2240/16* (2013.01); *F01N 2330/02* (2013.01); *Y02T 10/26* (2013.01)

(56) References Cited

U.S. PATENT DOCUMENTS

| | | | |
|---|---|---|---|
| 5,456,890 A * | 10/1995 | Tsai | F01N 3/2013 |
| | | | 422/174 |
| 5,474,746 A | 12/1995 | Maus et al. | |
| 5,480,621 A | 1/1996 | Breuer et al. | |
| 5,546,746 A | 8/1996 | Whittenberger et al. | |
| 5,582,805 A * | 12/1996 | Yoshizaki | F01N 3/2026 |
| | | | 422/174 |
| 2003/0017086 A1 | 1/2003 | Brück et al. | |

FOREIGN PATENT DOCUMENTS

| | | |
|---|---|---|
| WO | 8910471 A1 | 11/1989 |
| WO | 9305284 A1 | 3/1993 |

\* cited by examiner

ЕХHAUST-GAS TREATMENT DEVICE

CROSS-REFERENCE TO RELATED APPLICATION

This is a continuation, under 35 U.S.C. §120, of copending International Application No. PCT/EP2012/070544, filed Oct. 17, 2012, which designated the United States; this application also claims the priority, under 35 U.S.C. §119, of German Patent Application DE 10 2011 117 624.5, filed Nov. 4, 2011; the prior applications are herewith incorporated by reference in their entirety.

BACKGROUND OF THE INVENTION

Field of the Invention

The present invention relates to an exhaust-gas treatment device having a honeycomb body through which an exhaust gas can flow and which is wound and/or stacked with at least partially structured sheet-metal layers in such a way that channels are formed through which an exhaust gas can flow in an axial direction from an inlet side to an outlet side. In particular, the invention relates to an exhaust-gas treatment device which includes a heating element that heats the exhaust gas and/or the exhaust-gas treatment device by applying an electrical voltage thereto.

In order to limit the emission of pollutants from internal combustion engines, in particular in motor vehicles, use has long been made of catalytic converters for decontamination of the exhaust gas. In order to ensure that a catalytically assisted conversion of the pollutants takes place, the exhaust gas and/or the catalytic converter must be at a minimum temperature. In particular, after a cold start or restart of the internal combustion engine, the minimum temperature does not yet prevail. It is thus sought to increase the temperature of the exhaust gas and/or of the catalytic converter by using electrically operated heating elements.

International Publication No. WO 89/10471, corresponding to U.S. Pat. Nos. 5,146,743; 5,322,672; and 5,480,621, describes a honeycomb body with structured sheet-metal layers, in which at least one sheet-metal layer is heated directly by having a voltage applied thereto. In that concept, therefore, a sheet-metal layer that forms the honeycomb body is used as a heating element.

By contrast, it is known from International Publication No. WO 93/05284, corresponding to U.S. Pat. No. 5,474, 746, to integrate a heating wire between two sheet-metal layers. In the case of such a heating wire being used, however, it must be ensured, in a cumbersome manner, that adjacent sheet-metal layers can still be brazed to one another. Specifically, the heating wire has a significant influence on the form of the sheet-metal layers, and creates a spacing between adjacent sheet-metal layers.

SUMMARY OF THE INVENTION

It is accordingly an object of the invention to provide an exhaust-gas treatment device, which overcomes the hereinafore-mentioned disadvantages and at least partially solves the highlighted problems of the heretofore-known devices of this general type. In particular, it is an object to specify an exhaust-gas treatment device into which a heating element can be integrated and which is simple to produce.

With the foregoing and other objects in view there is provided, in accordance with the invention, an exhaust-gas treatment device, comprising a honeycomb body through which an exhaust gas can flow and which is wound and/or stacked with at least partially structured sheet-metal layers in such a way that channels are formed through which an exhaust gas can flow in an axial direction from an inlet side to an outlet side. A first section of the sheet-metal layers ends flush at a first end surface assigned to or associated with the inlet side and/or to the outlet side, and a second section of the sheet-metal layers ends likewise at a second end surface assigned to or associated with the inlet side and/or to the outlet side. The second end surface has a spacing to the first end surface, wherein the second end surface is formed in the interior of the honeycomb body in relation to the inlet side and/or the outlet side by virtue of a first length, in the flow direction, of the first section of sheet-metal layers being greater than a second length, in the flow direction, of the second section of sheet-metal layers. Due to the spacing between the first end surface and the second end surface, a receptacle is formed and a heating element is disposed in the receptacle.

The exhaust-gas treatment device is, in particular, constructed for the purification of exhaust gases of an internal combustion engine of a motor vehicle, and is thus, in particular, disposed in the exhaust line of the internal combustion engine. The honeycomb body is produced from at least partially structured sheet-metal layers which, during production, are preferably initially stacked, with structured and smooth sheet-metal layers alternating, and are subsequently wound. The structuring of the sheet-metal layers may preferably be realized by using cutouts, undulations and/or guide vanes. The structuring is, in particular, constructed in such a way that at least 100 cpsi [cells per square inch] or even at least 300 cpsi are formed over a cross section of the honeycomb body.

The first section of the sheet-metal layers and the second section of the sheet-metal layers may each have only a single sheet-metal layer or else may have a multiplicity of sheet-metal layers. It is, however, preferable for the first section of sheet-metal layers to have a multiplicity of sheet-metal layers and for the second section of sheet-metal layers to have precisely one sheet-metal layer. It is preferable for the first section of sheet-metal layers to end toward the inlet side, thus defining an inlet surface, because it is precisely in this plane that the exhaust gas enters the channels of the honeycomb body for the first time in the flow direction. In this case, the second section of the sheet-metal layers forms a second end surface which is disposed, with an axial spacing to the first end surface, downstream of the second end surface as viewed in the flow direction, wherein the second end surface forms an inlet surface into the channels formed by the second section of sheet-metal layers. Alternatively or in addition, the first section of sheet-metal layers forms a first end surface at the outlet side, wherein the second end surface formed by the second section of sheet-metal layers is disposed upstream of the first end surface as viewed in the flow direction. An "assignment" or "association" of the end surfaces to or with the inlet side or to or with the outlet side is to be understood, in particular, to mean that the respective end surface is positioned closer, or even adjacent, the inlet side/outlet side than to the opposite outlet side/inlet side.

According to the invention, the first length, in the flow direction, of the first section of sheet-metal layers is greater than the second length, in the flow direction, of the second section of sheet-metal layers, which means, in particular, that the second section of sheet-metal layers does not project beyond the first section of sheet-metal layers. It is thus preferable if, during production, all of the sheet-metal layers are disposed flush at the outlet side, whereby a spacing is formed between the first end surface and the second end surface at the inlet side. The heating element can be disposed in the receptacle formed by the spacing, which heating element is, in particular, connected, preferably adhesively bonded, to one of the sheet-metal layers. The sheet-metal layers, and if appropriate also the heating element, are subsequently wound to form the honeycomb body.

The heating element is formed, in particular, by an electrical conductor which is surrounded by an insulator. The heating element has terminal pieces which can be led out from the exhaust line and to which a voltage supply can be connected. In particular, the electrical conductor of the heating element has a cross-sectional area of at least 0.5 mm$^2$ [square millimeters], preferably of at least 3 mm$^2$, particularly preferably of at least 6 mm$^2$. The heating element is formed in the receptacle and is, in particular, connected to at least one sheet-metal layer of the honeycomb body, in such a way that the heating element is captively fastened in the honeycomb body. It is also possible for multiple heating elements to be integrated into the cutout or receptacle. It is also possible for a multiplicity of cutouts to be formed, into each of which there is inserted at least one heating element. If multiple heating elements are provided, they are preferably operable separately from one another, possibly in a coordinated manner, in such a way that it is, for example, possible to form differently settable heating zones. This may be realized by using a suitable voltage supply and regulating unit.

The invention provides an electrically heatable exhaust-gas treatment device which is simple to produce. The heating element may be integrated in a simple manner during the production process of the exhaust-gas treatment device, although it is also possible for the heating element to be integrated into the honeycomb body after the production of the latter.

In accordance with another feature of the invention, the sheet-metal layers have alternately disposed smooth sheet-metal layers and corrugated sheet-metal layers, wherein the second section of the sheet-metal layers includes only corrugated sheet-metal layers. This means, in particular, that the second section of the sheet-metal layers includes only precisely one corrugated sheet-metal layer, or else multiple corrugated sheet-metal layers. This has the effect that the smooth sheet-metal layers project at least beyond the corrugated sheet-metal layers of the second section of the sheet-metal layers. The receptacle is thus delimited by a smooth sheet-metal layer in one radial direction and likewise by a smooth sheet-metal layer in the opposite direction. Thus, in the case of the receptacle being formed on the inlet side, the at least one heating element is disposed upstream of the second end surface as viewed in the flow direction. It is advantageous in this case for the smooth sheet-metal layers to serve for supporting and/or enclosing the heating element, and for the exhaust gas to have to initially flow at least partially around the heating element in order to enter the channels formed by the second section of the sheet-metal layers. A good transfer of heat from the heating element to the exhaust gas is thus ensured.

In accordance with a further advantageous feature of the invention, the (at least one) heating element covers at most 50%, in particular preferably at most 30%, and very particularly preferably at most 10%, of the second end surface in the axial direction. The heating element is thus disposed upstream or downstream of the second end surface, and downstream or upstream, respectively, of the first end surface, as viewed in the flow direction. As viewed in the flow direction, therefore, only a small part of the second end surface is covered by the heating element. It is thus ensured that the flow resistance through the heating element is kept as low as possible.

In accordance with an added preferable feature of the invention, the heating element is adhesively bonded to a sheet-metal layer of the first section of sheet-metal layers. The electrical insulator of the heating element is thus cohesively connected to a sheet-metal layer, in particular to a smooth sheet-metal layer of the first section of sheet-metal layers. A captive connection is thus provided between the heating element and the honeycomb body, whereby a transfer of heat from the heating element to the sheet-metal layer is also ensured.

It is also preferable for a smooth sheet-metal layer of the first section of sheet-metal layers to be folded, and for the heating element to be disposed in the fold. A fold constitutes, in particular, a section of the sheet-metal layer which forms a type of pocket by using a turned-over or bent-over sheet-metal section. The number and/or structure of such folds may be selected while taking into consideration the type and/or number of heating elements and/or the deformability of the sheet-metal layers. A captive, form-locking connection is thus provided between the heating element and sheet-metal layers of the honeycomb body, in particular in the manner of an encasement. A form-locking connection is one which connects two elements together due to the shape of the elements themselves, as opposed to a force-locking connection, which locks the elements together by force external to the elements.

In accordance with an additional advantageous feature of the invention, the spacing between the first end surface and the second end surface is at least 0.1 cm [centimeters], preferably at least 0.3 cm. Through the use of such a spacing or depth of the receptacle, an adequate space is provided in which a suitable heating element can be disposed. The spacing is preferably at least 1 cm, very particularly preferably at least 2 cm.

In accordance with yet another particularly preferable feature of the invention, at least the first section of sheet-metal layers or the second section of sheet-metal layers has a catalytically active coating. Through the use of a catalytic coating, the conversion of the pollutants in the exhaust gas is ensured. In particular, it is preferable for both sheet-metal layers to have the same coating, at least as viewed in a cross section of the honeycomb body. Different coating zones may be formed in the axial direction.

In accordance with yet a further advantageous feature of the invention, an exhaust-gas treatment device is proposed in which two or more receptacles are formed in a honeycomb body, in each of which receptacles there is disposed a heating element. This thus means that two or more groups of sheet-metal layers are formed with a first section of sheet-metal layers and a second section of sheet-metal layers, wherein each group of sheet-metal layers has a receptacle. The groups of sheet-metal layers are, in particular, stacked one on top of the other, and subsequently wound together, during the production process. In this way, the heating elements can be distributed uniformly over the cross section of the honeycomb body.

In accordance with yet an added preferable feature of the invention, in this context, the heating elements are connected electrically in series. This is preferably achieved by virtue of terminals for the heating elements being guided radially out of the honeycomb body and contacted with one another there in electrically conductive fashion. It is the case, in particular, that the terminals are electrically insulated with respect to the honeycomb body or with respect to a tube that accommodates the honeycomb body.

In accordance with yet an additional advantageous feature of the invention, two or more honeycomb bodies are disposed in series in the axial direction, wherein each honeycomb body has at least one heating element. This is advantageous, in particular, if multiple heating elements in a honeycomb body would increase the flow resistance of the honeycomb body to an excessive extent.

In accordance with a concomitant particularly preferable feature of the invention, in this context, the heating elements are connected electrically in series. This may be realized by virtue of terminals for the heating elements being guided out of the honeycomb bodies and electrically connected to one another there. In this case, too, the terminals are, in particular, electrically insulated with respect to the honeycomb body or with respect to a tube that accommodates the honeycomb body. The guiding of terminals for the heating elements out of the honeycomb body also has the advantage that individual heating elements can be bypassed, connected in parallel, or supplied with current differently over time.

Other features which are considered as characteristic for the invention are set forth in the appended claims.

Although the invention is illustrated and described herein as embodied in an exhaust-gas treatment device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
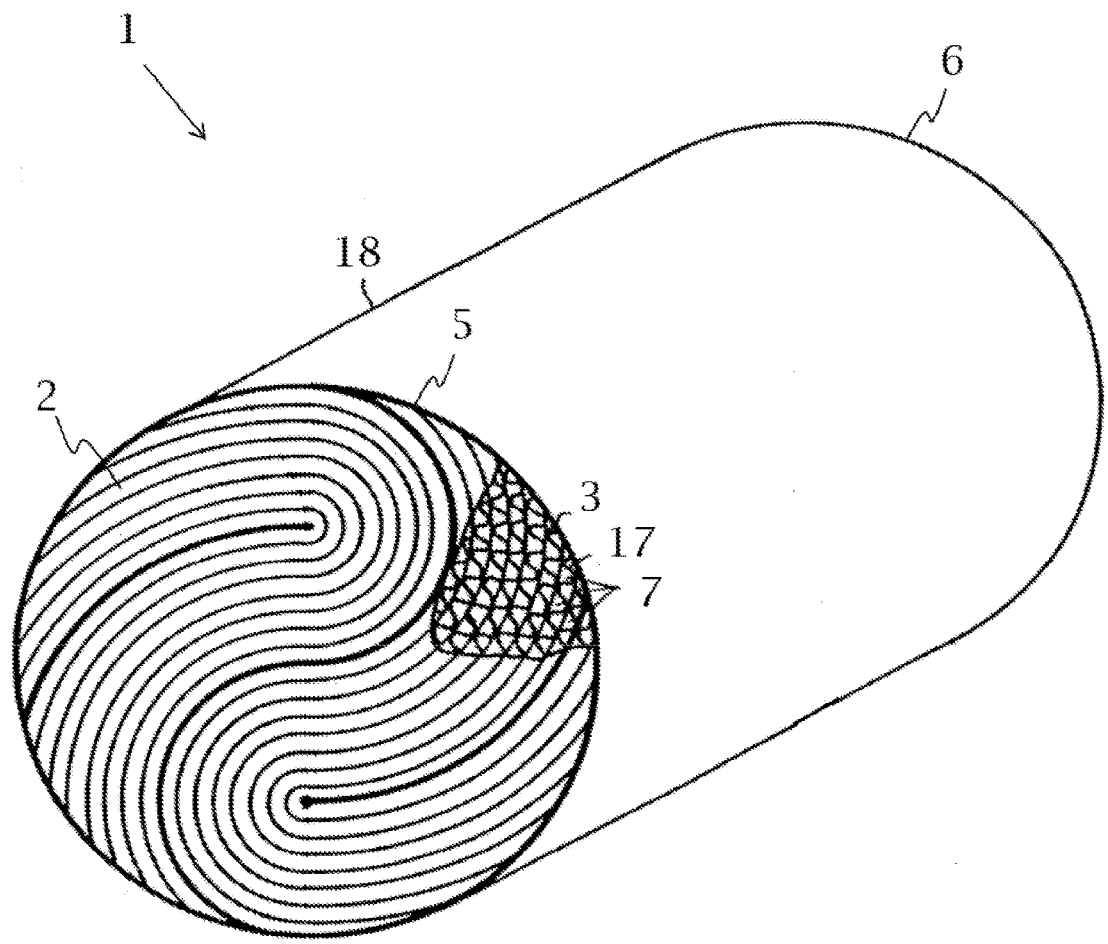
FIG. 1 is a diagrammatic, perspective view of a honeycomb body according to the prior art.

Referring now in detail to the figures of the drawing for explaining the invention and the technical field in more detail by showing particularly preferred structural variants to which the invention is not restricted, and first, particularly, to FIG. 1 thereof, there is seen a perspective view of an exhaust-gas treatment device 1 having a honeycomb body 2 according to the prior art in an exhaust line 18. The honeycomb body 2 includes a multiplicity of smooth sheet-metal layers 3 and corrugated sheet-metal layers 17, which are stacked one on top of the other and wound. The sheet-metal layers 3, 17 form a multiplicity of through flow channels 7 which extend from an inlet side 5 to an outlet side 6. The honeycomb body is to be regarded as representative of all honeycomb bodies which are constructed from coated sheet-metal layers and in which the individual sheet-metal layers bear with both ends against a casing tube. Such a construction is particularly suitable for the present invention because electrical terminals for a heating element running along the sheet-metal layers can thereby be guided easily to the outside.

Figure 2:
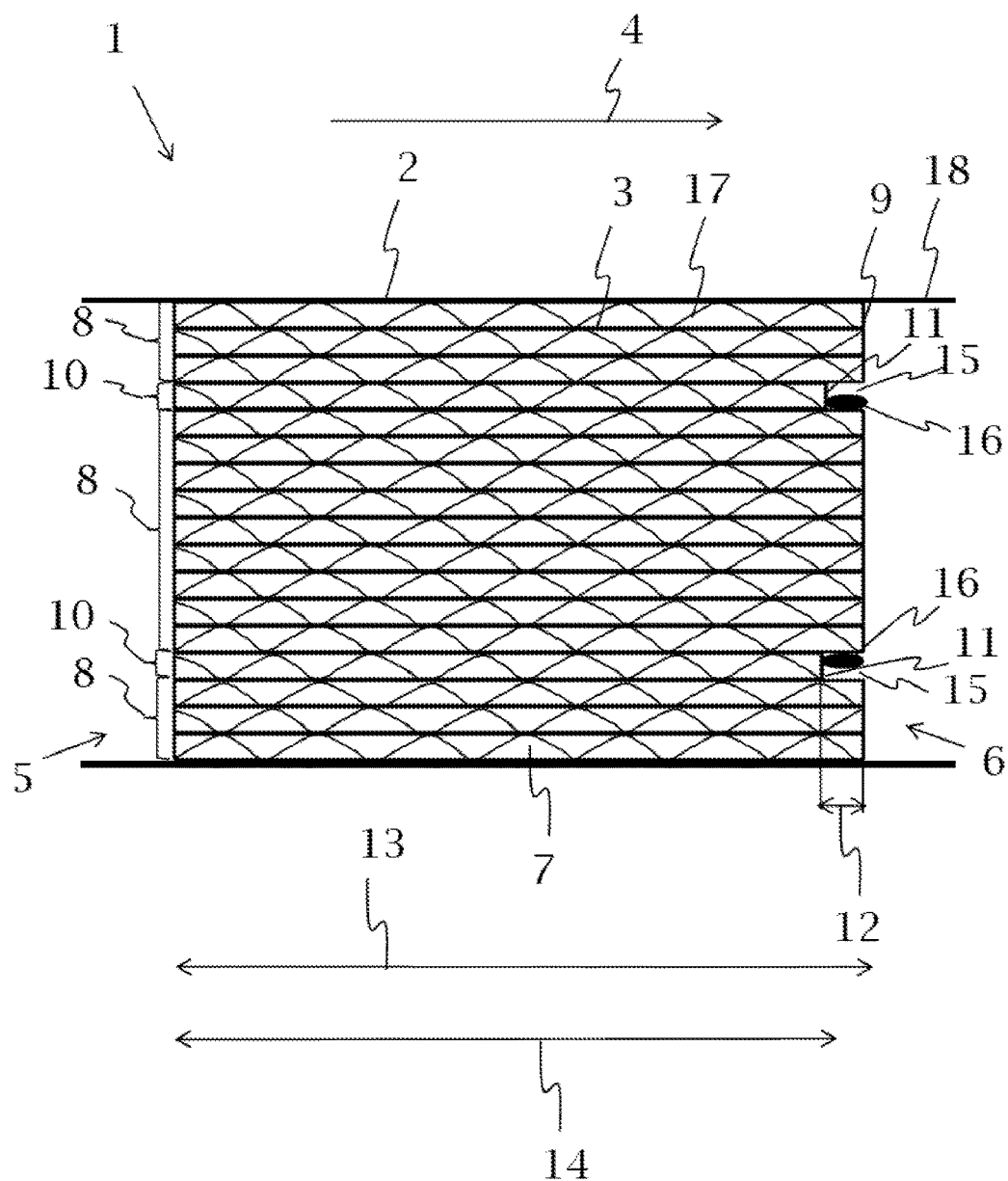
FIG. 2 is a longitudinal-sectional view of a honeycomb body according to the invention.

FIG. 2 diagrammatically shows a longitudinal section through an exhaust-gas treatment device 1 which has a honeycomb body 2 and which is disposed in an exhaust line 18. The honeycomb body 2 has smooth sheet-metal layers 3 and corrugated sheet-metal layers 17. The corrugation of the corrugated sheet-metal layers 17 in this case is merely diagrammatically indicated (with a configuration rotated through 90°) in order to provide an improved illustration. The corrugation in fact extends in the circumferential direction of the honeycomb body 2, in such a way that the axially running wave peaks and wave troughs form the channels 7 in the axial direction 4. The exhaust gas can flow through the channels 7 from an inlet side 5 to an outlet side 6, as illustrated in FIG. 1. The sheet-metal layers 3, 17 are divided into a first section or part 8 of sheet-metal layers and a second section or part 10 of sheet-metal layers. The first section 8 of sheet-metal layers forms a first end surface 9 in a flush manner at the outlet side 6, and the second section 10 of sheet-metal layers forms a second end surface 11 at the outlet side 6. The first end surface 9 is disposed at a spacing 12 from the second end surface 11. The spacing 12 is realized by virtue of the first section 8 of sheet-metal layers having a first length 13 in the axial direction 4 and the first length being greater than a second length 14 of the second section 10 of sheet-metal layers. Due to the spacing 12 between the first end surface 9 and the second end surface 11, a receptacle 15 is formed and a heating element 16 is disposed in the receptacle. The heating element 16 has terminals through which it can be connected to a voltage source.

During operation, by virtue of a voltage being applied to the heating element 16, the latter is heated by ohmic resistance heating, whereby the honeycomb body 2, and the exhaust gas, are heated in turn. In this way, it is possible at any time for the exhaust gas temperature to be increased to a value higher than the temperature required for a catalytic reaction.

In this exemplary embodiment, the first section 8 of the sheet-metal layers has both smooth sheet-metal layers 3 as well as corrugated sheet-metal layers 17. By contrast, the second section 10 of the sheet-metal layers has only one corrugated sheet-metal layer 17 in each case. The receptacle 15 is thus delimited in the upward and downward directions by a smooth sheet-metal layer 3.

The flow direction in the axial direction 4, as indicated in this exemplary embodiment, is merely exemplary, and may also run counter to the axial direction illustrated herein. The inlet side 5 and the outlet side 6 would be correspondingly interchanged.

Figure 3:
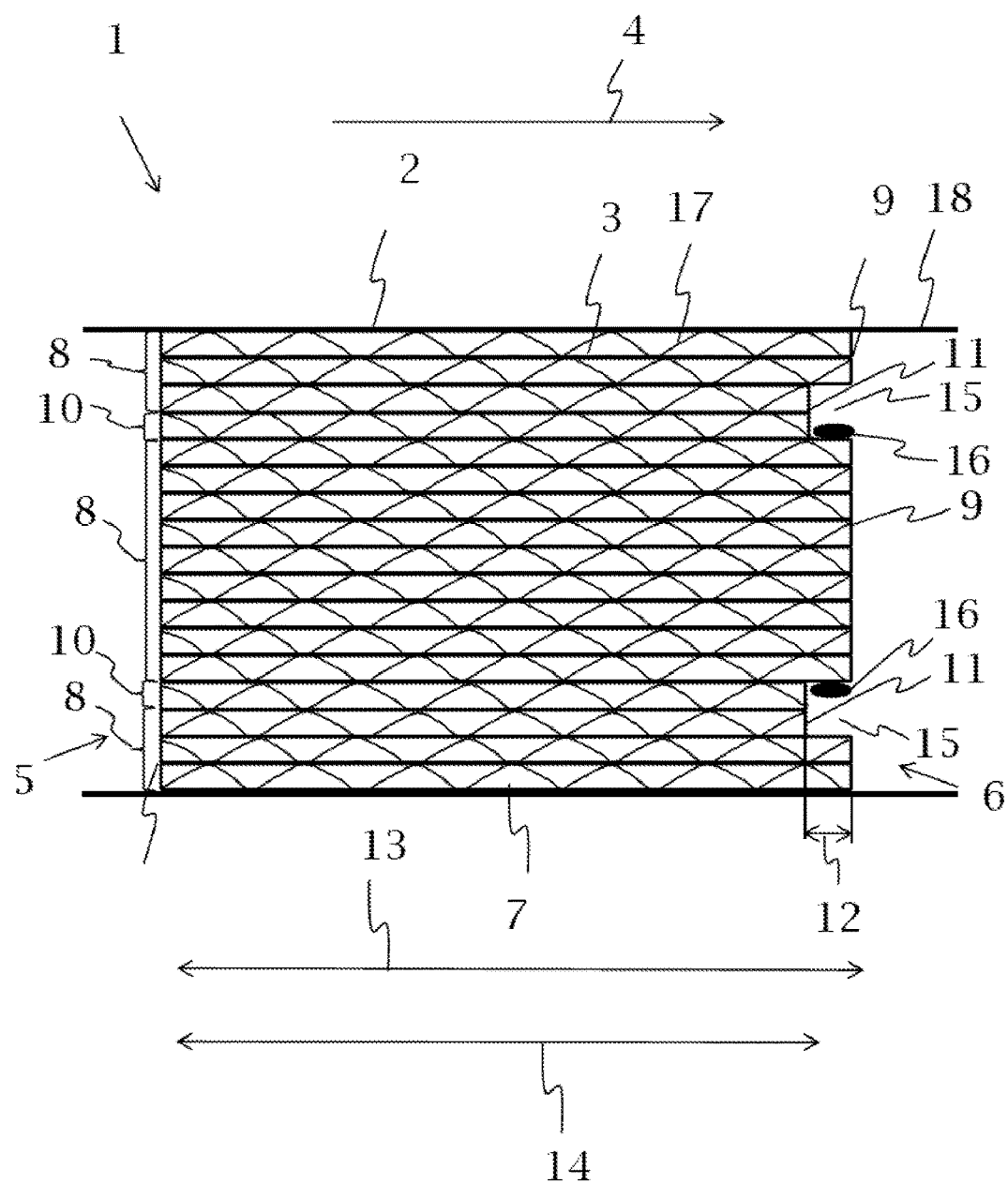
FIG. 3 is a longitudinal-sectional view of a further honeycomb body according to the invention.

FIG. 3 diagrammatically shows a further embodiment of the exhaust-gas treatment device 1 in a longitudinal section. Only the differences between the embodiment of FIG. 2 and the embodiment of FIG. 3 will be discussed below. In the embodiment according to FIG. 3, the second section 10 of the sheet-metal layers has both two corrugated sheet-metal layers 17 as well as one smooth sheet-metal layer 3. As a result, the extent of the receptacle 15 transversely with respect to the flow direction is greater.

Figure 4:
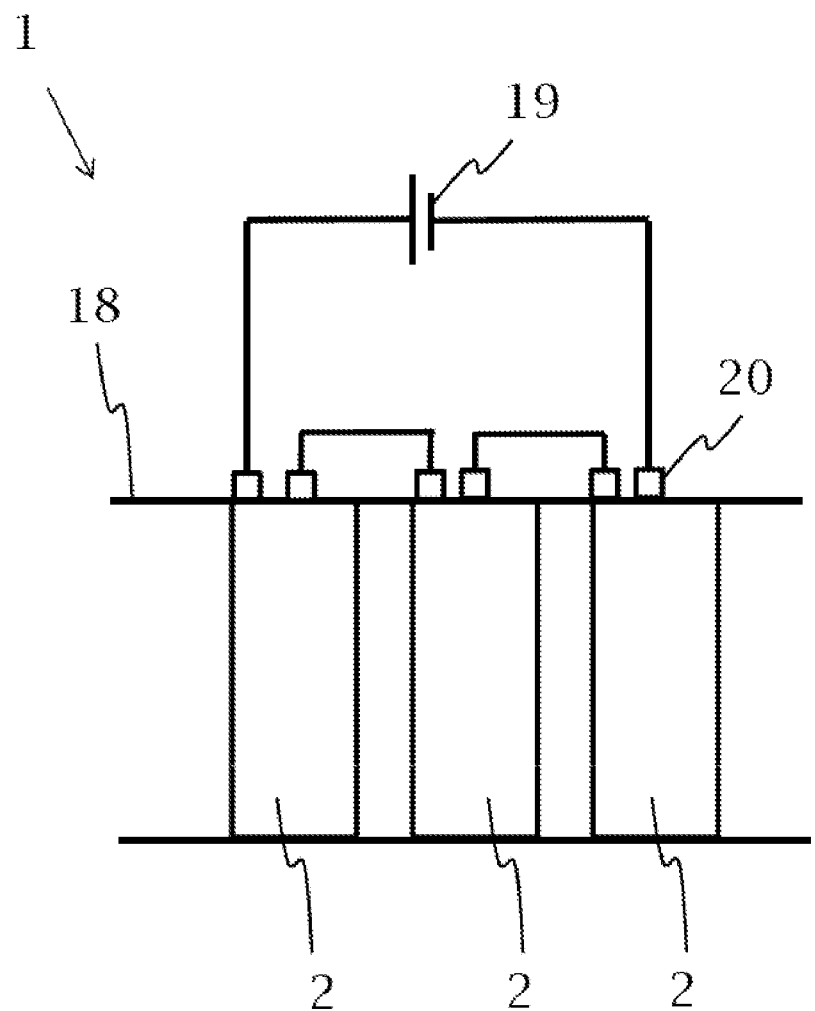
FIG. 4 is a schematic diagram of an embodiment of an exhaust-gas treatment device.

FIG. 4 schematically shows a further embodiment of an exhaust-gas treatment device 1. The exhaust-gas treatment device 1 has three honeycomb bodies 2 which are disposed, in series in the axial direction in an exhaust line 18, in such a way that an exhaust gas can flow through. The honeycomb bodies 2 are constructed in the same way as the honeycomb body 2 shown in FIG. 2 or FIG. 3. The exhaust-gas treatment device 1 also has a voltage source 19 which is connected through lines to one respective terminal 20 of each of the first and the third honeycomb body 2. The terminals 20 are guided in an electrically insulated manner through the exhaust line 18 and serve for the contacting of the non-illustrated heating elements 16 of the honeycomb bodies 2. The heating elements 16 are thus connected electrically in series, as illustrated therein. It is, however, easily possible for some other connection configuration to be realized retroactively.

Through the use of the present invention, it is possible in a simple manner to produce an electrically heatable exhaust-gas treatment device 1 into which a heating element 16 can be integrated during or after the production of the honeycomb body 2.

Even though the respective figures show exemplary embodiments that combine a multiplicity of technical features with one another in each case, it is clear to a person skilled in the art that individual features may also be combined separately with other embodiments of the exhaust-gas treatment device. This should at any rate be considered to be the case where no clear and explicit reference is made above to an imperative combination of features. In particular, statements made relating to the diagrammatic illustrations (such as, for example, in FIGS. 1 and 4) may be combined with the details from the other figures.

The invention claimed is:

1. An exhaust-gas treatment device, comprising:
a honeycomb body through which an exhaust gas can flow;
said honeycomb body having an inlet side, an outlet side, an axial direction and at least partially structured, wound or stacked sheet-metal layers forming channels configured to conduct an exhaust gas flow in said axial direction from said inlet side to said outlet side, said sheet-metal layers include alternately disposed smooth sheet-metal layers and corrugated sheet-metal layers;
said honeycomb body having a first end surface associated at least with said inlet side or said outlet side and a second end surface associated at least with said inlet side or said outlet side, said second end surface being at least partially defined by at least one terminal end surface of one of said corrugated sheets;
said sheet-metal layers including a first section of sheet-metal layers ending flush at said first end surface and a second section of sheet-metal layers ending at said second end surface;
said first section of sheet-metal layers having a first length in said axial direction, said second section of sheet-metal layers having a second length in said axial direction, said first length being greater than said second length defining a spacing between said first and second end surfaces;
said spacing forming a receptacle; and
a heating element disposed in said receptacle.

2. An exhaust-gas treatment device, comprising:
a honeycomb body through which an exhaust gas can flow;
said honeycomb body having an inlet side, an outlet side, an axial direction and at least partially structured, wound or stacked sheet-metal layers forming channels configured to conduct an exhaust gas flow in said axial direction from said inlet side to said outlet side said sheet-metal layers including alternately disposed smooth sheet-metal layers and corrugated sheet-metal layers;
said honeycomb body having a first end surface associated at least with said inlet side or said outlet side and a second end surface associated at least with said inlet side or said outlet side;
said sheet-metal layers including a first section of sheet-metal layers ending flush at said first end surface and a second section of sheet-metal layers ending at said second end surface, and said second section of sheet-metal layers including only corrugated sheet-metal layers;
said first section of sheet-metal layers having a first length in said axial direction, said second section of sheet-metal layers having a second length in said axial direction, said first length being greater than said second length defining a spacing between said first and second end surfaces;
said spacing forming a receptacle; and
a heating element disposed in said receptacle.

3. An exhaust-gas treatment device, comprising:
a honeycomb body through which an exhaust gas can flow;
said honeycomb body having an inlet side, an outlet side, an axial direction and at least partially structured, wound or stacked sheet-metal layers forming channels configured to conduct an exhaust gas flow in said axial direction from said inlet side to said outlet side;
said honeycomb body having a first end surface associated at least with said inlet side or said outlet side and a second end surface associated at least with said inlet side or said outlet side;
said sheet-metal layers including a first section of sheet-metal layers ending flush at said first end surface and a second section of sheet-metal layers ending at said second end surface;
said first section of sheet-metal layers having a first length in said axial direction, said second section of sheet-metal layers having a second length in said axial direction, said first length being greater than said second length defining a spacing between said first and second end surfaces;
said spacing forming a receptacle; and
a heating element disposed in said receptacle, said heating element covering at most 50% of said second end surface in said axial direction.

4. The exhaust-gas treatment device according to claim 1, wherein said heating element is fastened to a sheet-metal layer of said first section of sheet-metal layers.

5. The exhaust-gas treatment device according to claim 1, wherein said spacing between said first end surface and said second end surface is at least 0.1 cm.

6. The exhaust-gas treatment device according to claim 1, wherein at least said first section of sheet-metal layers or said second section of sheet-metal layers has a catalytically active coating.

7. The exhaust-gas treatment device according to claim 1, wherein said receptacle is one of two or more receptacles formed in said honeycomb body, and said heating element is one of two or more heating elements each disposed in a respective one of said receptacles.

8. The exhaust-gas treatment device according to claim 7, wherein said heating elements are connected electrically in series.

9. The exhaust-gas treatment device according to claim 1, wherein said honeycomb body is one of two or more honeycomb bodies disposed in series in said axial direction, and each of said honeycomb bodies has at least one respective heating element.

10. The exhaust-gas treatment device according to claim 9, wherein said heating elements are connected electrically in series.

* * * * *